United States Patent
Bogdanov et al.

(10) Patent No.: US 6,625,517 B1
(45) Date of Patent: Sep. 23, 2003

(54) POSITION FEEDBACK SYSTEM AND METHOD FOR USE THEREOF

(76) Inventors: Emil D. Bogdanov, 3063 Columbia Trail Rd., Loveland, OH (US) 45140; Mark S. Ortiz, 1145 Glen Echo La., Milford, OH (US) 45140; Donald A. Arms, 321 S. Main St., Middletown, OH (US) 45044; Gregory A. Bologna, 226 Cannonade Dr., Loveland, OH (US) 45140; Randall C. Restle, 9 Winding Way, Crestview Hills, KY (US) 41017

( * ) Notice: Subject to any disclaimer, the term of this patent is extended or adjusted under 35 U.S.C. 154(b) by 358 days.

(21) Appl. No.: 09/587,365

(22) Filed: Jun. 2, 2000

Related U.S. Application Data

(60) Provisional application No. 60/131,027, filed on Apr. 26, 1999, provisional application No. 60/137,346, filed on Jun. 3, 1999, provisional application No. 60/144,483, filed on Jul. 17, 1999, provisional application No. 60/185,019, filed on Feb. 25, 2000, provisional application No. 60/185,065, filed on Feb. 25, 2000, and provisional application No. 60/185,020, filed on Feb. 25, 2000.

(51) Int. Cl.⁷ .............................................. G06F 19/00
(52) U.S. Cl. .......................... 700/193; 700/56; 700/61; 700/302; 702/150; 324/207.21
(58) Field of Search ......................... 700/56, 57, 61, 700/58, 64, 302, 275, 186, 190–194; 702/150; 324/207.13, 207.14, 207.21

(56) References Cited

U.S. PATENT DOCUMENTS

| | | | |
|---|---|---|---|
| 3,814,647 A | * 6/1974 | Lemelson | 408/8 |
| 3,898,555 A | 8/1975 | Tellerman | 324/207.13 |
| 3,939,372 A | * 2/1976 | Wurst et al. | 310/168 |
| 4,654,590 A | 3/1987 | Kitaura et al. | 324/207.13 |
| 4,658,214 A | 4/1987 | Petersen | 324/207.24 |
| 4,709,210 A | * 11/1987 | Pond | 324/207.13 |
| 4,760,294 A | 7/1988 | Hansen | 310/12 |

(List continued on next page.)

FOREIGN PATENT DOCUMENTS

| | | |
|---|---|---|
| DE | 22 57 321 | 5/1973 |
| EP | 0 292 843 A1 | 11/1988 |
| EP | 0 471 073 A1 | 2/1992 |
| EP | 0764584 A2 | 3/1997 |
| EP | 0 887 265 A1 | 12/1998 |
| GB | 716783 | 11/1961 |
| GB | 2 257 321 A | 6/1993 |
| WO | WO 90/08086 | 7/1990 |
| WO | WO 96/27544 | 9/1996 |
| WO | WO/96/27544 A1 | 9/1996 |

OTHER PUBLICATIONS

A Tutorial on the New Magnetoresistive Technology Current Sensor, Drafts et al., http://fwbell.com/Catalogs/Sensors/Curre...nology/_magnetoresistive_technology.html, 3 pages.

Lewin, C., "Commutation Smooths Out the Bumps" *Motion Control* (Jan./Feb. 1998), pp. 30–33.

Matthes, R., "Holding the Line" *Motion Control* (Jul./Aug. 1998) pp., 30–32.

*Primary Examiner*—Leo Picard
*Assistant Examiner*—Paul Rodriguez
(74) *Attorney, Agent, or Firm*—Dechert LLP; John W. Ryan

(57) ABSTRACT

The present invention is directed to a machine with a position feedback system and a method for use thereof. The machine includes at least one movable element mounted for movement on a path and at least one programmable controller. The machine further includes at least two absolute or magnetostrictive sensors or the machine includes an absolute sensor and a non-absolute sensor. The programmable controller uses positional information from the sensors to determine the position of the movable elements on the path and control the movable elements. The method includes determining a known position for the movable elements, linking at least two magnetostrictive sensors into one virtual sensor, and/or performing commutation alignment for the movable elements. Determining the position and commutation alignment can occur when the movable elements are stationary or moving.

26 Claims, 16 Drawing Sheets

U.S. PATENT DOCUMENTS

| | | | |
|---|---|---|---|
| 4,943,773 A | 7/1990 | Koski et al. | 324/207.13 |
| 4,970,464 A | 11/1990 | Williams | 324/207.13 |
| 5,023,495 A | 6/1991 | Ohsaka et al. | 310/12 |
| 5,187,475 A | 2/1993 | Wagener et al. | 340/870.32 |
| 5,196,791 A | 3/1993 | Dumais | 324/207.13 |
| 5,198,761 A | 3/1993 | Hashimoto et al. | 324/207.12 |
| 5,230,688 A | 7/1993 | Hatchell et al. | 493/193 |
| 5,256,943 A * | 10/1993 | German | 318/685 |
| 5,274,328 A | 12/1993 | Begin et al. | 324/207.12 |
| 5,313,160 A | 5/1994 | Gloden et al. | 324/207.13 |
| 5,367,257 A * | 11/1994 | Garshelis | 324/207.22 |
| 5,377,474 A | 1/1995 | Kovacs et al. | 53/64 |
| 5,412,317 A | 5/1995 | Kyoizumi | 324/207.14 |
| 5,430,360 A * | 7/1995 | Rosenthal et al. | 318/574 |
| 5,473,245 A | 12/1995 | Silvus, Jr. et al. | 324/207.13 |
| 5,621,316 A | 4/1997 | Dames et al. | 324/207.13 |
| 5,653,085 A | 8/1997 | Suga | 53/75 |
| 5,717,330 A | 2/1998 | Moreau et al. | 324/207.13 |
| 5,775,134 A * | 7/1998 | Otobe et al. | 66/204 |
| 5,804,961 A | 9/1998 | Castillo et al. | 324/207.13 |
| 5,816,018 A | 10/1998 | Bois | 53/133.4 |
| 5,831,352 A | 11/1998 | Takei | 310/12 |
| 5,929,631 A * | 7/1999 | Striker et al. | 324/207.21 |
| 5,965,963 A | 10/1999 | Chitayat | 310/12 |
| 5,998,991 A | 12/1999 | Begin | 324/207.13 |
| 6,032,437 A | 3/2000 | Bois | 53/412 |
| 6,369,563 B1 * | 4/2002 | Krahe et al. | 324/207.13 |

* cited by examiner

POSITION FEEDBACK SYSTEM AND METHOD FOR USE THEREOF

CROSS-REFERENCE TO RELATED APPLICATIONS

This application claims the benefit of U.S. Provisional Applications Nos. 60/131,027, filed Apr. 26, 1999; 60/137,346, filed Jun. 3, 1999; 60/144,483, filed Jul. 17, 1999; and 60/185,019, 60/185,020, 60/185,065, each filed on Feb. 25, 2000. Each of these applications is incorporated by reference in their entirety.

BACKGROUND OF THE INVENTION

Technical Field

The present invention relates to machines with moving elements, and more particularly to a system and method for determining the position of the moving elements and for using such position data in controlling such elements.

Background of Invention

Packaging machines that form a tube from a web of material are known. In these machines, a portion of the tube is filled with a product, such as fluid or other flowable product. Two, spaced portions on the tube are sealed transversely by a pair of sealing jaws in the packaging machine to form a closed package with the product therein. The tube is then severed through the sealed portions to separate the package from adjacent ones formed by the machine. This type of packaging machine is generally referred to as a form, fill and seal (FFS) machine.

Commonly, each of the packages must be filled with a consistent volume of product. This consistency of volume can be provided by making the individual packages of equal volume when sealed. This is accomplished by forming the transverse seals at equally spaced apart locations along the length of the web. In order to so form the seals, movable elements with the sealing jaws thereon must be monitored and controlled accurately to assure the seals are formed at the correct locations. These systems generally use encoders or resolvers to aid in monitoring and controlling the elements.

One drawback to using encoders and resolvers for position feedback is that systems utilizing this type of feedback require homing to a known position before normal operation can begin. Also, with the increased use of software-based motion control systems, commutation alignment must be completed before the homing process, if soft-ware based commutation with algorithmic initialization is employed. Both these processes require movement of the movable elements, which is undesirable in a web-fed FFS machine, as this initialization process generally involves the rejection of packaging material and/or product. This results in increased manufacturing cost and lower yield on the machine. Therefore it is desirable to provide an improved machine that can quickly initialize and home movable elements on a machine at startup or following a fault condition without these drawbacks.

Some position feedback systems determine the position of a movable element by determining the position of a machine component other than the moveable element. For example, machines can determine the position of an electrical motor, belt, or gear, and infer that the movable element so driven has a position consistent therewith. When the monitored component, for example the belt or gear, does not function properly, the position data for the movable element is not accurate.

Other machines that have linear, open paths have started to utilize a single magnetostrictive linear position sensor to determine the position of various components on the path. These sensors have not been applied to closed-loop paths, such as those used in packaging machines. In addition, a single, magnetostrictive sensor has a limited update speed making its use in high-speed applications problematic.

Thus, there remains a need in the art for a system and method for monitoring moving carriages using sensors and features that do not have the drawbacks of the prior art systems and allow highly accurate and fast monitoring and control of moving carriages.

SUMMARY OF THE INVENTION

The present invention is directed to an improved machine, such as for the packaging of product(s) in individual packages on a continuous basis. The machine comprises at least one path, at least two magnetostrictive sensors disposed on the path, at least one movable element mounted for movement on the path, and at least one programmable controller. The programmable controller is operatively associated with each sensor and each movable element, and receives at least one signal from one of the sensor(s). This signal is representative of at least one control variable of at least one of the associated movable elements. In this arrangement, the magnetostrictive sensors can be arranged on the path to partially overlap. Furthermore in this arrangement, three or more magnetostrictive sensors can be used or magnetostrictive sensors of the same or different lengths can be used.

In this arrangement, the movable element includes a magnet operatively associated with the magnetostrictive sensors.

In one embodiment, the machine includes a plurality of movable elements mounted on the path that are movable and positionable independently of one another. In yet another embodiment, the machine further includes at least two, closed paths defined by at least two, separate guide members spaced from one another and a plurality of moving elements are mounted for movement along each of the guide members.

Alternatively, a machine of the present invention also includes at least one magnetostrictive sensor and at least one non-absolute sensor disposed on the path. In this arrangement, a plurality of non-absolute sensors can be used and the non-absolute sensor(s) can be a step and direction type of sensor or an incremental type of sensor, which can be at least one Hall Effect sensor. The machine may include movable elements with magnets operatively associated with the magnetostrictive sensor and another actuation device operatively associated with the non-absolute sensor(s).

The present invention is also directed to a method for determining the position of at least one moveable element on a path, comprising the steps of: providing at least one movable element that is movable on the path, each movable element has at least one magnet mounted thereon, providing at least two magnetostrictive sensors on the path for outputting positional information on each movable element the magnetostrictive sensors are operatively associated with at least one magnet, and providing a first programmable controller electrically connected to the sensor(s). The method further includes the step of the first programmable controller linking the magnetostrictive sensors into a single, continuous, virtual sensor on the path. In this method, a second programmable controller can use the virtual sensor to control the movement of the movable elements. Furthermore, the method can include the step of providing first and second programmable controllers, where the first programmable controller is at least one digital signal processor and the second controller is a motion controller.

This method can further include performing commutation alignment on at least one movable element on the path, when the movable element is stationary. The method can also include determining a known position for at least one movable element on the path, when the movable element is stationary or moving.

The present invention is also directed to a method for using positional information for at least one movable element on a path, comprising the steps of: providing at least one movable element that is movable on the path including at least one magnet mounted thereon, providing at least one magnetostrictive sensor on the path for outputting positional information on each movable element, the magnetostrictive sensor is operatively associated with the magnet, and providing at least one programmable controller electrically connected to each sensor. The method further includes using the positional information from each sensor.

In the method, the step of providing at least one movable element can further include providing a servo-motor with each movable element, wherein the step of using the positional information includes performing commutation alignment on each servo-motor using the positional information from each sensor. Alternatively, the step of using the positional information can include determining a known position for the movable element on the path while the element is stationary or moving. In the method, the step of performing commutation alignment can occur when the associated movable element is stationary or moving.

The method may also include providing at least one non-absolute sensor on the path and determining a known position using information from the non-absolute sensor(s).

BRIEF DESCRIPTION OF THE DRAWINGS

To facilitate the understanding of the characteristics of the invention, the following drawings have been provided wherein.

DETAILED DESCRIPTION OF INVENTION

In the following description and appended claims the term "magnetostrictive sensor" is used to describe sensors with a head connected to a waveguide that are absolute position feedback sensors. In the following description and appended claims the term "non-absolute sensor" is used to describe step and direction type sensors or incremental sensors. In the following description and appended claims the term "programmable controller" or "controller" is used to describe an electronic component linked to the sensors. When more than one magnetostrictive sensor is used to programmable controller is the digital signal processor (DSP), discussed below, that links the sensors to the motion controller. Alternatively the microcontroller can replace the DSP. When only one magnetostrictive sensor is used to programmable controller is the motion controller that links the sensor to the drive. In this arrangement, if non-absolute sensors are used another programmable controller can be used to receive signals therefrom.

Figure 1:
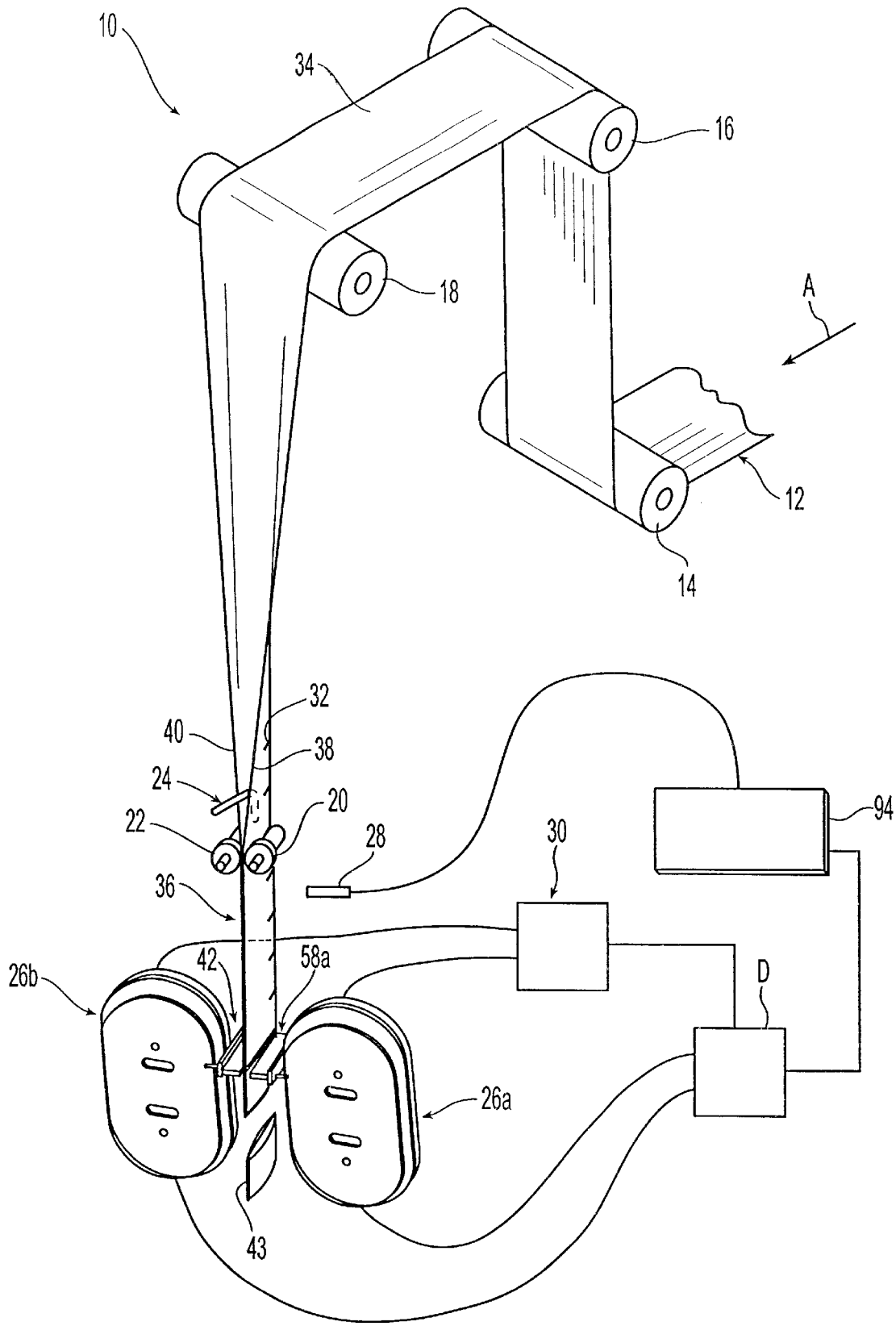
FIG. 1 is a partial, perspective view of a form, fill and seal packaging machine embodying various features of the invention.

Referring to FIG. 1, a form, fill and seal (FFS) packaging machine 10 of the present invention is for use with a workpiece or web 12 of packaging material. The packaging machine 10 includes a plurality of rollers 14–18 for guiding the web, a pair of rollers 20, 22 for folding and longitudinally sealing the web, a filling station 24, a pair of sealing and cutting assemblies 26a–b, a registration sensor 28 disposed between the filling station 24, and the pair of sealing and cutting assemblies 26a–b, and a controller 30 to be discussed below.

The web 12 includes a plurality of spaced registration marks 32 and at least one sealable surface 34. The web 12 is fed forward, as represented by the arrow A, over rollers 14, 16, and 18. Subsequently, the web 12 is continuously folded by the rollers 20 and 22 into a tube 36. The longitudinally overlaid side edges 38, 40 of the web 12 are sealed to complete the tube 36.

A product, such as a food product for example, juice, milk, potato chips, or other flowable liquids or solids, is fed into the closed tube 36 at the filling station 24. Subsequently, the filled tube is fed to the pair of sealing and cutting assemblies 26a–b that form a sealing and cutting station 42. At the station 42, the tube 36 is sealed transversely of its length at longitudinally spaced apart locations. Thereafter, the tube 36 is severed transversely and within the bounds of the sealed areas to form individual packages 43 filled with the product.

Figure 2:
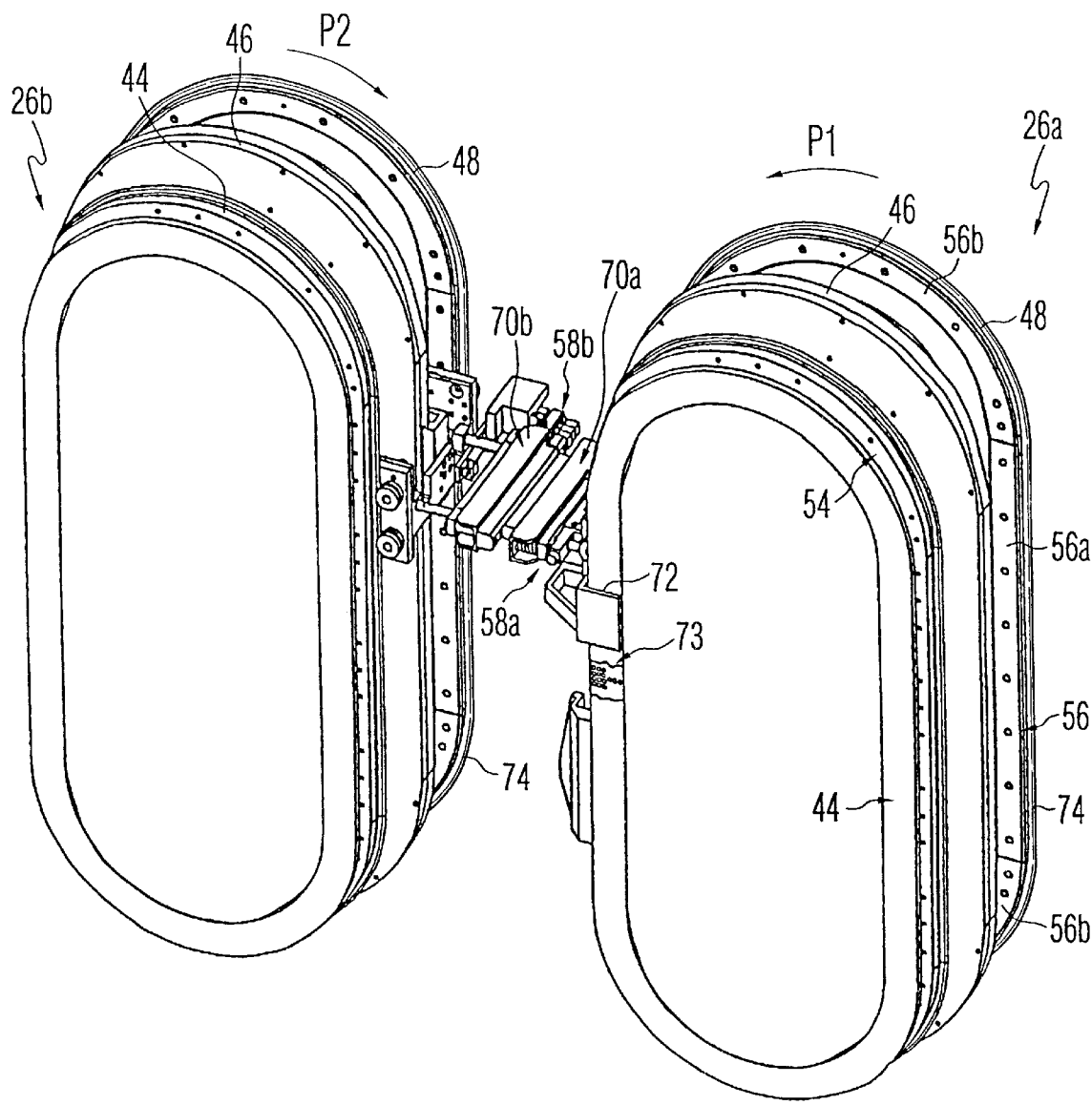
FIG. 2 is an enlarged, partial, perspective view of a pair of sealing and cutting assemblies of the packaging machine of FIG. 1, showing magnetostrictive and non-absolute sensors mounted thereon, wherein a portion of one of the assemblies is broken away for clarity.

The sealing and cutting assemblies 26*a–b* generally include right assembly 26*a* and left assembly 26*b*. As shown in FIG. 2, each assembly 26*a,b* includes first, second and third frame members 44, 46, 48, which are preferably aligned parallel with each other and spaced apart from one another. The frame members 44, 46, and 48 are joined by support members (not shown).

Referring again to FIG. 2, the first and second, separate, guide members or tracks 54 and 56 are respectively mounted to the frame members 44 and 48. Preferably the tracks 54 are mounted along the outer peripheral margin of frame members 44 and 48. The tracks 54 and 56 preferably have straight segments 56*a* joined together by curved segments 56*b* to define closed, oval paths or circuits, indicated by arrows P1 and P2. The paths may alternatively have other shapes and/or be formed as open paths. Although two paths are shown the machine 10 can include two or more paths. For example, the machine can include another assembly disposed perpendicular to the assemblies 26*a,b* and central there between for removing the finished packages 43 (as shown in FIG. 1) therefrom.

Figure 3:
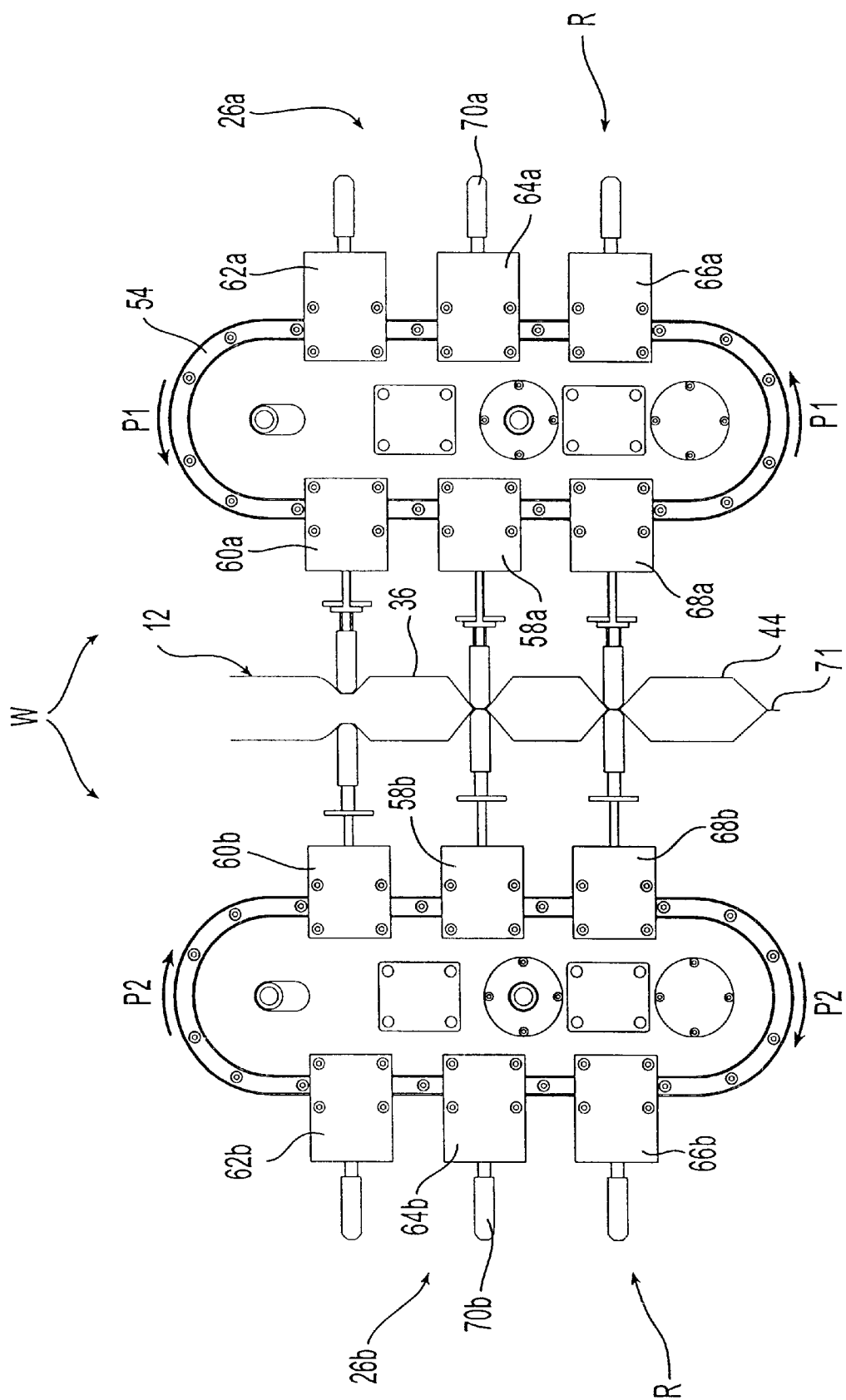
FIG. 3 is a side view of the sealing and cutting assemblies of FIG. 2 that include six pairs of carriages.

Referring to FIGS. 2 and 3, the right assembly 26*a* has first movable elements or carriages 58*a*, 60*a*, 62*a*, 64*a*, 66*a*, and 68*a* mounted thereto. The left assembly 26*b* has second movable elements or carriages 58*b*, 60*b*, 62*b*, 64*b*, 66*b*, and 68*b* mounted thereto. The guide members or tracks 54 and 56 function to constrain the carriages to follow the paths P1 and P2, and the present invention is not limited to the particular types of guide members or tracks shown herein.

The carriages are configured and dimensioned to be securely mounted on the tracks 54 and 56 for movement along the tracks 54 and 56. At least three, and more preferably six pairs of opposing carriages, i.e., 58*a* and 58*b*, 60*a*, and 60*b*, 62*a* and 62*b*, 64*a* and 64*b*, 66*a* and 66*b*, and 68*a* and 68*b* are present. The first carriages 58*a*–68*a* of each pair are driven along of the path P1, and the second carriages 58*b*–68*b* of each pair are driven along the other path P2. Each carriage includes a tool 70*a, b* and an arm 72. The tools 70*a, b* preferably function as a sealing jaw and/or a cutter.

In another embodiment, the tool can be a working member, implement, device or the like for performing other work functions usually on a product, such as a product on an assembly line. The tools can also include, for example, a bin or a volume controller to control the volume of product in each of the packages.

Referring to FIG. 3, each sealing and cutting subassemblies 26*a, b* has a working side labeled W and a return side labeled R. The working side W is the side of the subassemblies 26*a, b* adjacent the web 12. The return side R is opposite the working side W. The tools 70*a, b* are designed to engage opposite sides of the moving web 12 on the working side W, apply pressure against the web, and form a seal 71 transversely on the web. To perform the sealing operation at the desired point on the web, one tool 70*a* of the first subassembly 26*a* must register and the tool 70*b* of the second subassembly 26*b* must register with marks 32 on the web, with the tube 36 disposed there between for a finite period of time that is sufficient to produce the desired transverse seal 71.

Figure 3A:
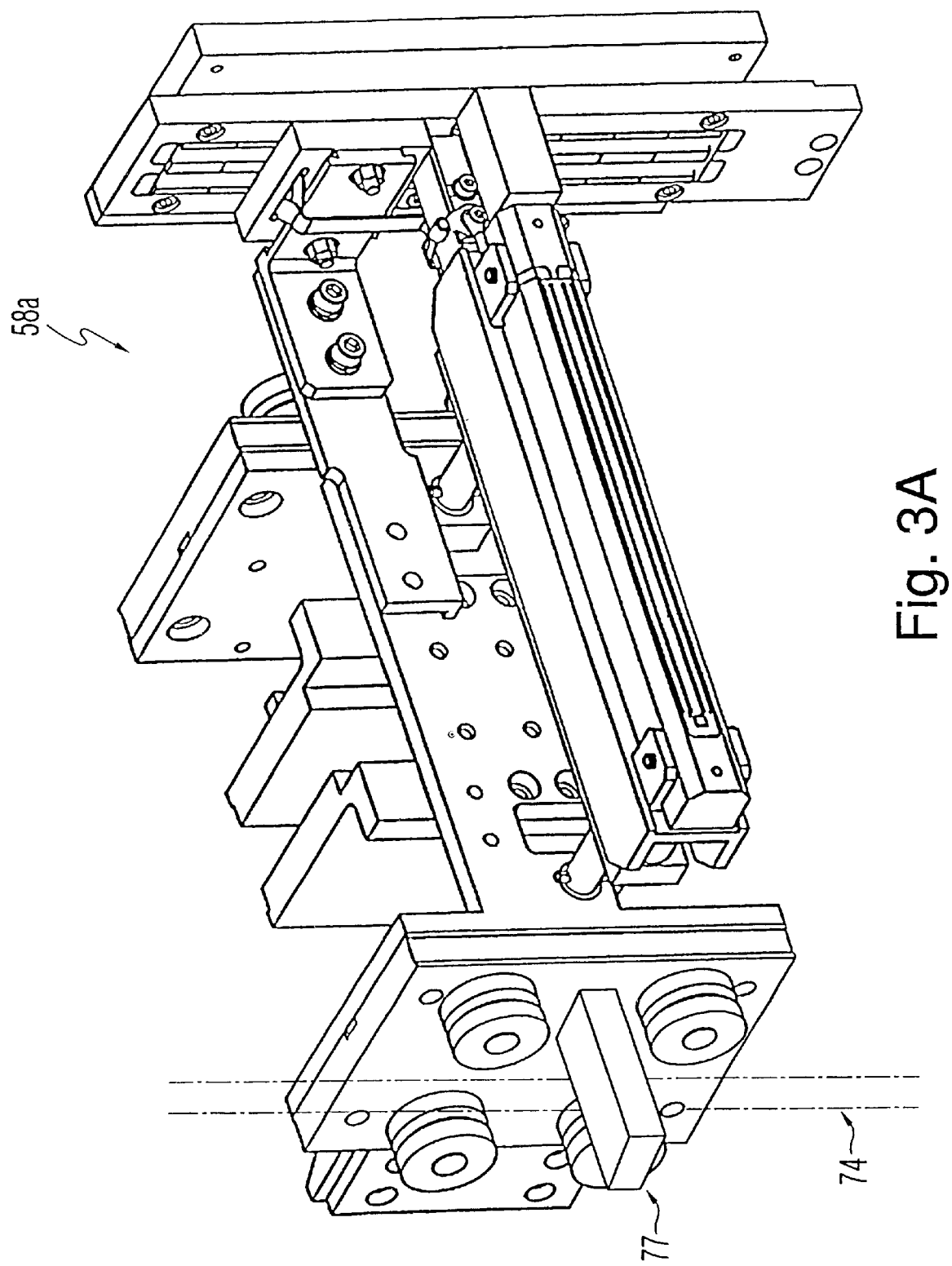
FIG. 3A is an enlarged, perspective view of a carriage for use with the machine of FIG. 2 showing the position of a magnet with respect to the magnetostrictive sensor.
Figure 4:
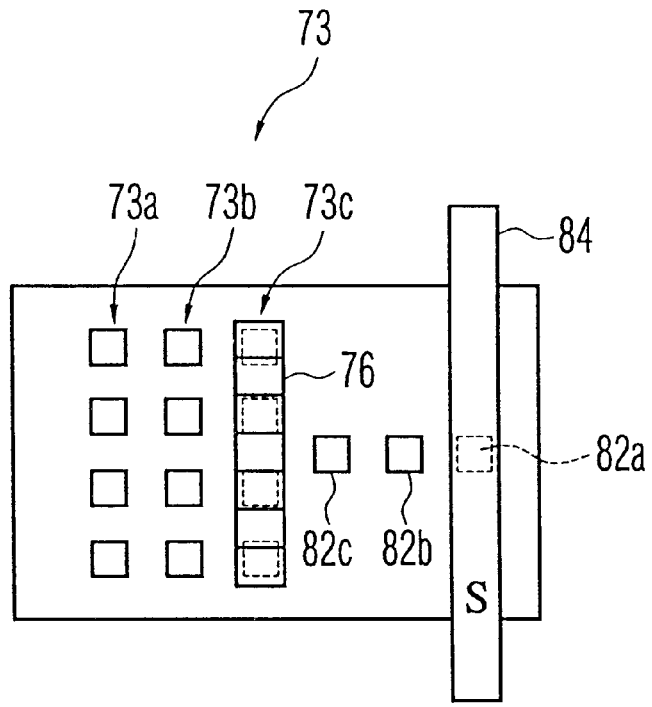
FIG. 4 is a schematic representation of a plurality of analog and digital Hall Effect sensors and cooperating magnets, used for incremental position feedback.

Referring to FIGS. 2 and 3A, the machine includes an array of non-absolute sensors 73 and a magnetostrictive sensor 74. The sensors 73 are mounted on the frame member 44, and the sensor 74 is secured to the frame member 48 with brackets not shown. The arm 72 supports at least two magnets, which are one encoder magnet 76 and a coil switching magnet 84 (as shown in FIG. 4). The magnets 76 and 84 are fixedly connected to the carriage. The arm 72 should be configured to allow the magnets 76 and 84 to pass over the non-absolute sensors mounted on frame 44. Depending on the type of non-absolute sensors used, magnets 76 and 84 can be replaced with another type of actuation device. The side of the carriage 58*a* opposite from magnet 76 has a member that supports another magnet 77 so that the magnetic field generated by magnet 77 is operatively associated with magnetostrictive sensor 74, as discussed below.

Figure 4A:
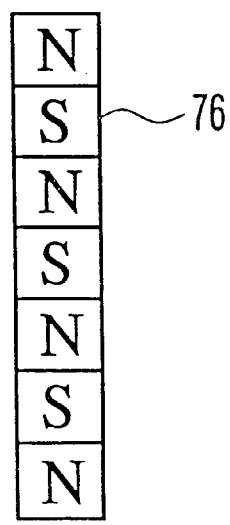
FIG. 4A is a schematic representation of one embodiment of the magnet for use with the analog sensors of FIG. 4.

Referring to FIGS. 4 and 4A, preferably the non-absolute sensors 73 include arrays of analog sensors 73*a–c* that are Hall Effect sensors arranged in three rows 73*a*, 73*b*, 73*c* that are aligned with the length dimension of the track, one row per carriage. These Hall Effect sensors of each row are spaced apart from one another. The magnet 76 is mounted on each carriage in a position such that movement of the carriage moves its magnet 76 past the row of Hall Effect sensors, which is representative of the carriage in question.

Figure 5:
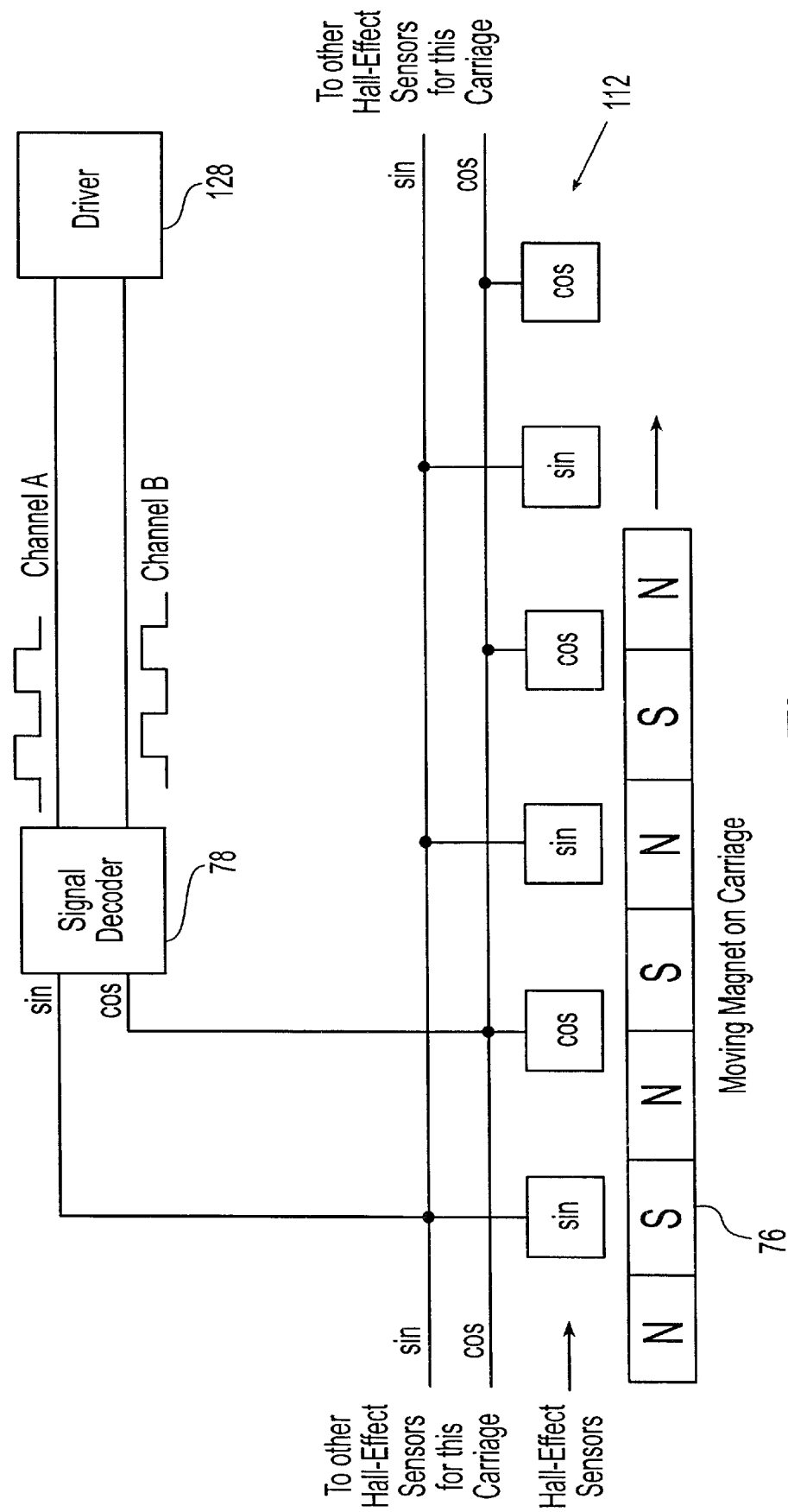
FIG. 5 is a schematic representation of the association between the magnet of FIG. 4A and the sensors of FIG. 4.

Referring to FIG. 4A, the magnet 76 comprises a plurality of aligned magnets whose poles alternate along the length of the magnet 76. This magnet 76 is oriented on its respective carriage with its length dimension parallel to the length dimension of its respective Hall Effect sensor row 73*a–c*. Relative movement of the magnet 76 past the individual Hall Effect sensors of its respective row 73*a–c*, for example, generates a series of sine-cosine signals which are fed to a signal decoder 78 (as shown in FIG. 5) that produces outputs identified as Channel A and Channel B that are in turn fed to a servo-amplifier or driver 128 (as shown in FIG. 5).

Figure 6:
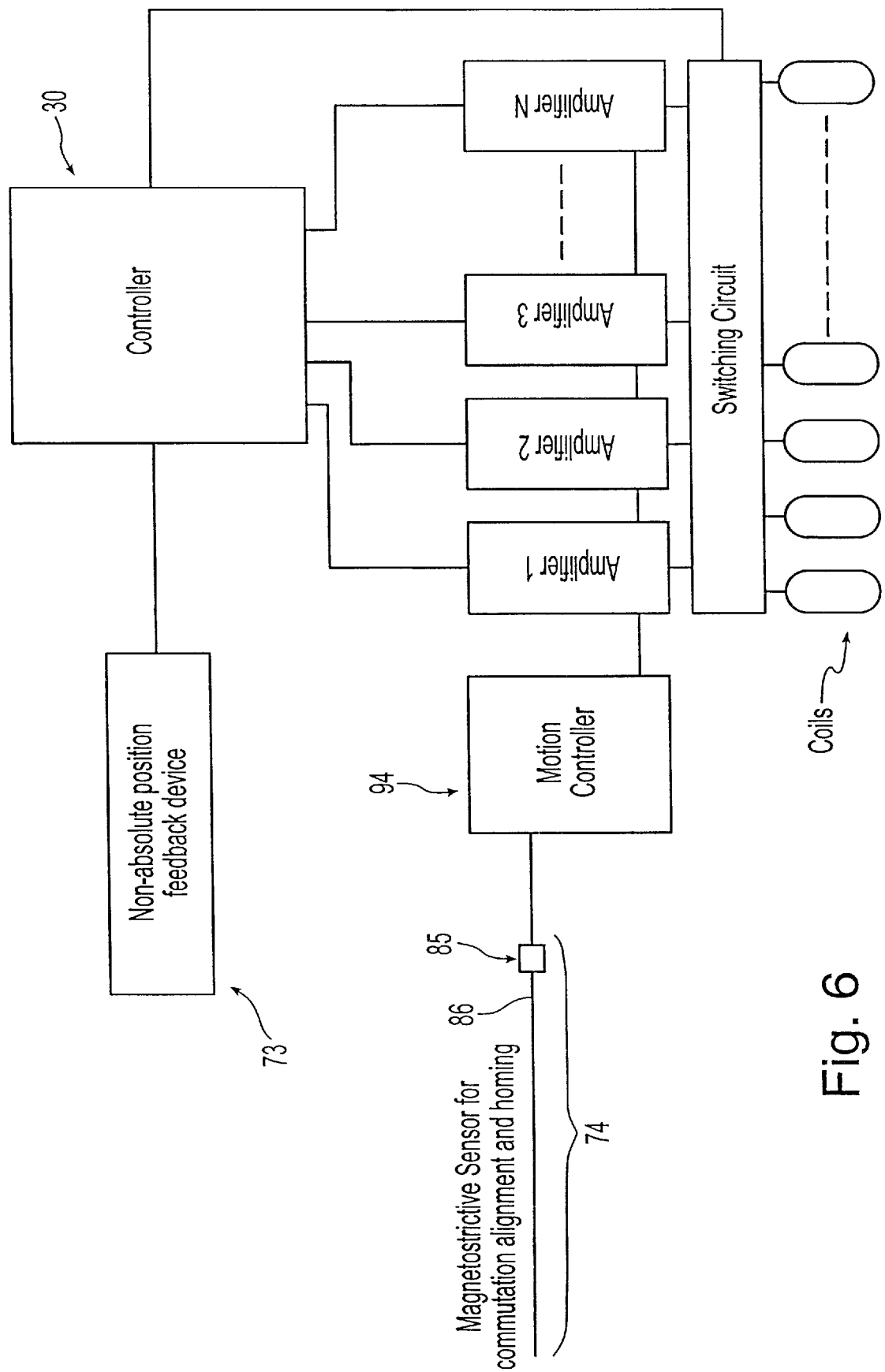
FIG. 6 is a schematic view of the control system configuration for use with the machine of FIG. 2.

Referring again to FIG. 4, opening and closing of switches (not shown) to drive the carriages may be effected employing digital Hall Effect sensors 82*a–c* which are triggered by a magnet 84 also mounted on the carriage. In the depicted embodiment, the south pole of the magnet 84 faces toward the sensor 82*a*, and its north pole faces away from the sensor 82*a*. Each sensor 82*a–c* is associated with a power switch (not shown), which enables a coil (as shown in FIG. 6), as a carriage moves past the sensor. This permits an amplifier to feed electrical energy to the coil that is associated with the given switch. Each sensor 82*a–c* is specific for its respective carriage by reason of the spatial location of the magnet mounted on the carriage relative to the spatial location of its respective sensor.

The sensors 73 provide positional data for a known position of the carriage, but require that the carriage is homed to a known position before the positional data generated by sensors 73 is useful. In an alternative embodiment, other types of non-absolute sensors can be used to provide step and direction type or incremental feedback. These sensors can be Hall Effect based sensors or other types of sensors, such as magnetoresistive sensors or optical encoders.

Referring to FIGS. 2 and 6, the magnetostrictive sensor 74 operatively associated with magnet 77 (as shown in FIG. 3A) is arranged circumferentially about the frame member 48. The magnetostrictive sensor 74 has a sensor head 85 and a tail or waveguide 86 electrically connected thereto. The sensor 74 is connected to the assemblies 26*a,b* so that it is operatively associated with the carriages 58*a* and 58*b*, and so that the head 85 and tail 86 do not interfere with the movement of the carriages about the path. Recommended magnetostrictive sensors are commercially available from MTS Systems Corporation of Cary, N.C. under the name of Temposonics®. The sensors 74 are electrically connected to the controller 30 (as shown in FIG. 1) among other components discussed below. In this embodiment, the magnetostrictive sensors 74 provide positional information for use by the controller to perform commutation alignment and homing of the carriages, when they are stationary or moving slowly.

Figure 7:
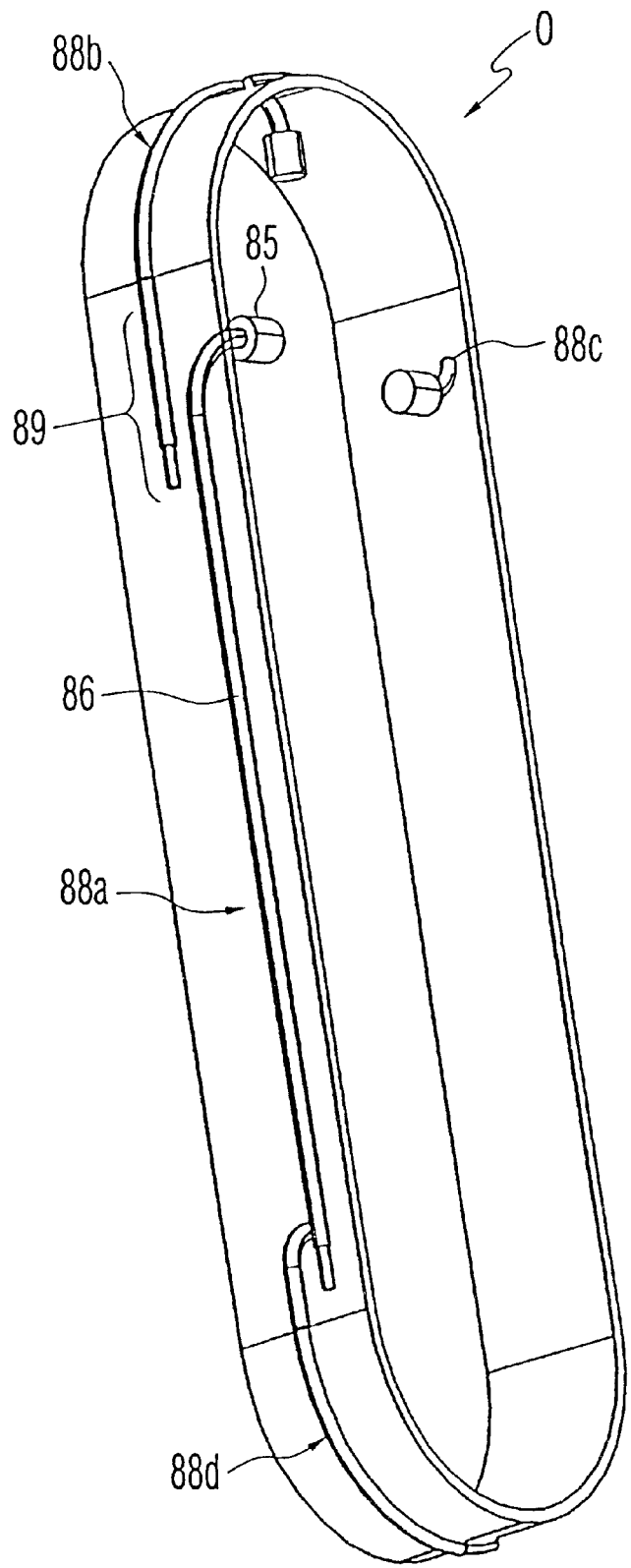
FIG. 7 is an enlarged, perspective view of an alternative arrangement for mounting a plurality of magnetostrictive sensors on the packaging machine of FIG. 1.

Referring to FIGS. 2 and 7, an alternative embodiment of a portion of the assemblies 26*a,b* is shown. In this embodiment, four absolute or magnetostrictive sensors are used for commutation alignment, homing and position data for four carriages. The magnetostrictive sensors 88*a–d* are operatively associated with a magnet, similar to magnet 77 shown in FIG. 3A. The sensors 88*a–d* are arranged circumferentially about oval support member O. The oval support member O is disposed between, for example the frame members 44 and 46. Preferably, the sensors 88*a–d* are arranged so that portions of adjacent sensors 88*a* and 88*b* at least partially overlap, such as in overlap zone 89. This overlap allows continuous position data to be obtained for the carriages so that the controller can link the magnetostrictive sensors 88*a–d* into a single, continuous, virtual sensor on the path. Although this overlap is preferred, it is not essential. The data from the magnetostrictive sensors is an absolute value. This data can be used as an absolute value or modified into incremental positional data, using the data in its absolute or incremental form depends on the motion controller and drives selected. The sensors 88*a–d* are connected to the assemblies 26*a,b* so that they are operatively associated with the carriages and so that the heads 85 and tails 86 do not interfere with the movement of the carriages about the path. Preferably, the head of one sensor is adjacent to the tail of another sensor.

Figure 7A:
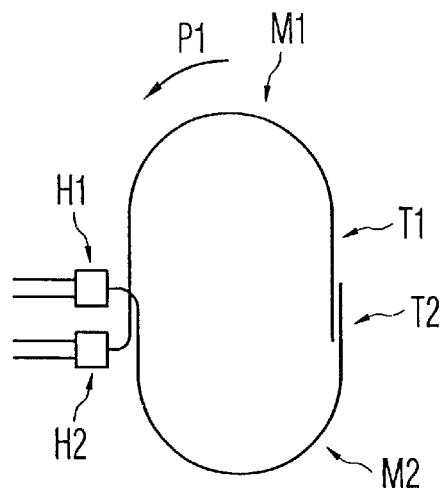
FIGS. 7A–7C are schematic plan views of alternative arrangements of magnetostrictive sensors.

Referring to FIG. 7A, an alternative arrangement of magnetostrictive sensors M1 and M2 is shown. Sensors M1 and M2 are used on path P1. The sensors M1 and M2 are mounted as discussed above and have heads H1, H2 and tails T1, T2, respectively. The heads are in electrical communication with the controller. The sensors M1 and M2 are arranged so that the heads H1 and H2 are adjacent one another and the ends of the tails T1 and T2 are adjacent one another.

Figure 7B:
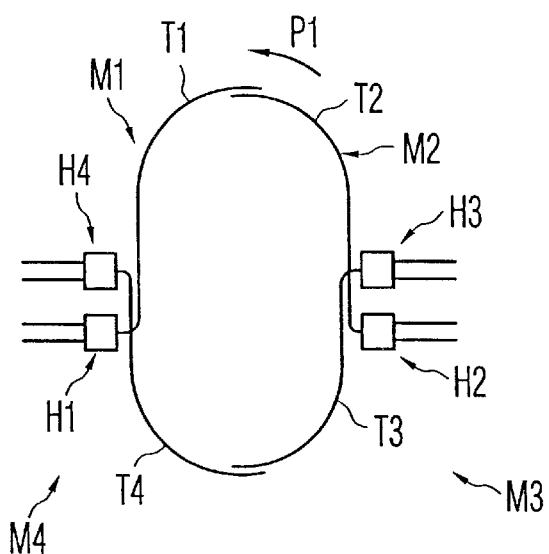

Referring to FIG. 7B, another magnetostrictive sensor arrangement is shown. This arrangement has four sensors M1–M4. The sensors M1–M4 are mounted as discussed above and have heads H1–H4 and tails T1–T4, respectively. The heads are in electrical communication with the controller. The head H1 of sensor M1 is adjacent the head H4 of sensor M4. The head H2 of sensor M2 is adjacent the head H3 of sensor M3. The end of tail T1 of sensor M1 is adjacent the end of the tail T2 of sensor M2. The end of tail T4 of sensor M4 is adjacent the end of the tail T3 of sensor M3. All of the sensors M1–M4 have the same length.

Figure 7C:
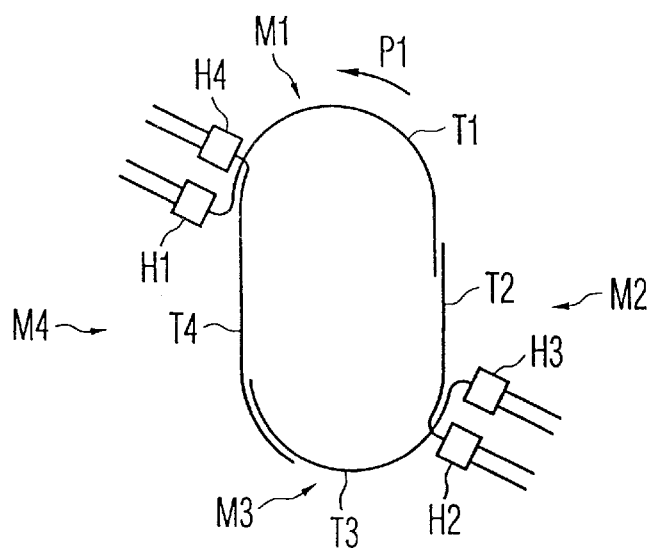

Referring to FIG. 7C, another magnetostrictive sensor arrangement is shown. This arrangement has four sensors M1–M4. The sensors M1–M4 are mounted as discussed above and have heads H1–H4 and tails T1–T4, respectively. The heads are in electrical communication with the controller. The head H1 of sensor M1 is adjacent the head H4 of sensor M4. The head H2 of sensor M2 is adjacent the head H3 of sensor M3. The end of tail T1 of sensor M1 is adjacent the end of the tail T2 of sensor M2. The end of tail T4 of sensor M4 is adjacent the end of the tail T3 of sensor M3. All of the sensors M1, M3 and M4 have the same length. The sensor M2 is about half the length of the other sensors M1, M3 and M4. This allows the sensor M2 to be updated at twice the speed of the other sensors. When a magnet is located over the overlap zone or the transition from M1 to M2, the data from sensor M2 is received and processed by the controller. Since this data is the most current it is used instead of the data from the other sensors. In another embodiment, the sensor M2 can also have a length less than half the length of the other sensors.

Referring to FIG. 1, the subassemblies 26*a,b* further include or are connected to drive D for providing a motive force to the carriages. The drive D includes a transmission (not shown) that can include a plurality of conveyers, belt members or chains (not shown). Alternatively, the drive can include drive magnets and coils of a linear motor or at least one servo-motor. In various embodiments, one servo-motor can drive a single carriage, or a number of carriages can be coupled together and driven by one servo-motor. The drive D is electronically connected to the controller 30. The drive D allows at least two of the carriages on one subassembly 26*a* or 26*b* to be driven independently with respect to one another so that the movement or non-movement of every other carriage is irrelevant. In another embodiment, several carriages are coupled on the same assembly 26*a* or 26*b* and the couples are movable independently of one another. Alternative embodiments of the invention have carriages with separate drives so that they are movable completely independent from each other.

The drive D may require a position data update time of less than 250 $\mu$s, which dictates the length of the magnetostrictive sensor(s) used. On average, the position data update for the magnetostrictive sensor is delayed by about nine (9) $\mu$s for every inch of sensor length. In cases where a longer sensor is needed, this delay may be significant. To make such a system usable, multiple shorter sensors may be used to minimize the update time. Thus, the number of sensors is not limited, and can be selected depending upon the length of the track and the desired update time. Preferably, at least three or more sensors are used for higher speed applications. When two or more sensors are used, the programmable controller (i.e., DSPs) link the sensors together into a single, continuous, virtual sensor on the path.

Referring again to FIG. 1, the registration sensor 28 is preferably an optical sensor or photoeye capable of optically detecting the registration marks 32. Alternatively, the sensor is an infrared or fluorescent ink sensor or a proximity probe. Signals from the sensor 28 are used by the controller.

Figure 8:
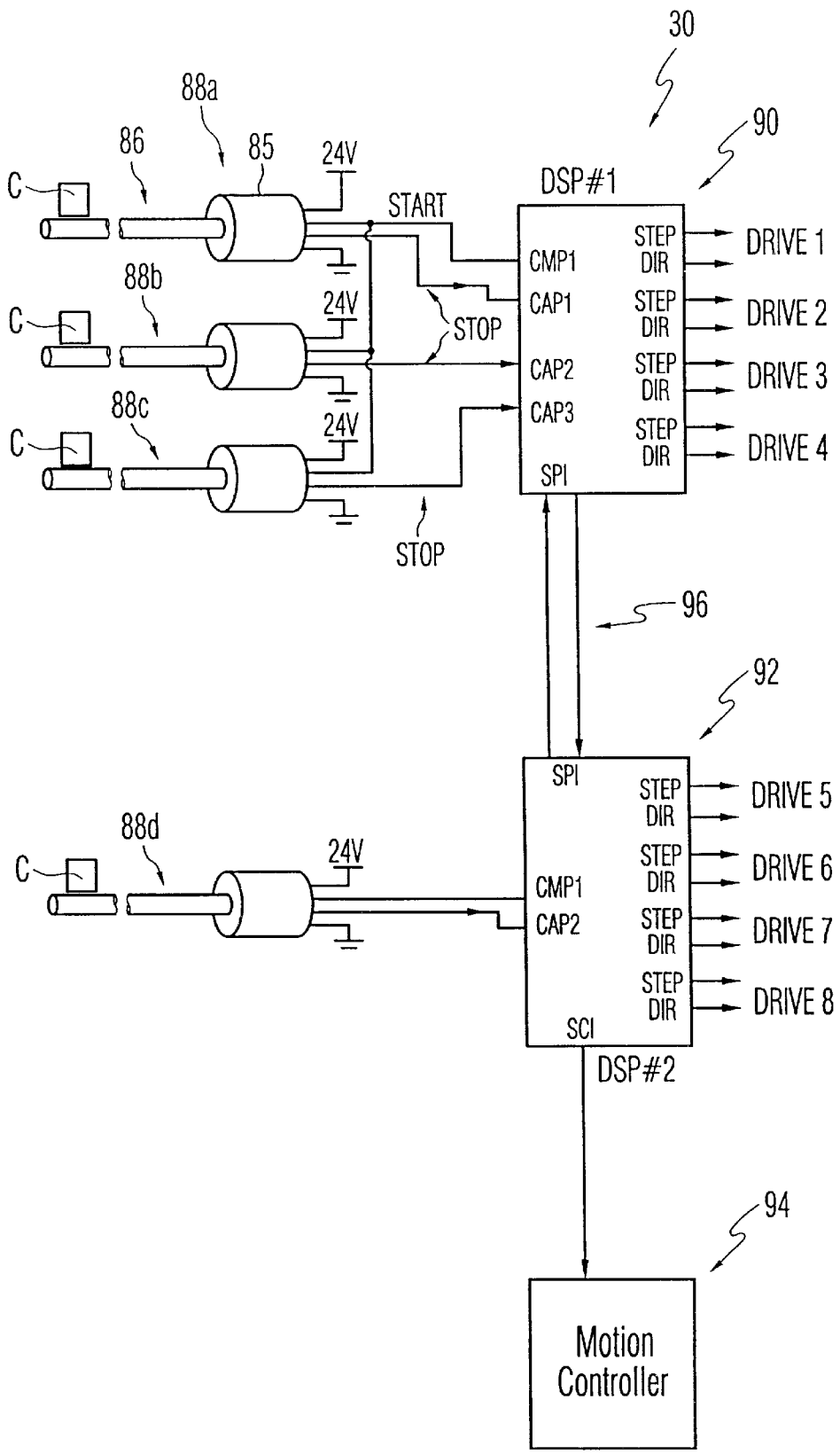
FIG. 8 is a schematic view of a control system configuration for use with the machine of FIGS. 7 and 7A–7C.
Figure 9:
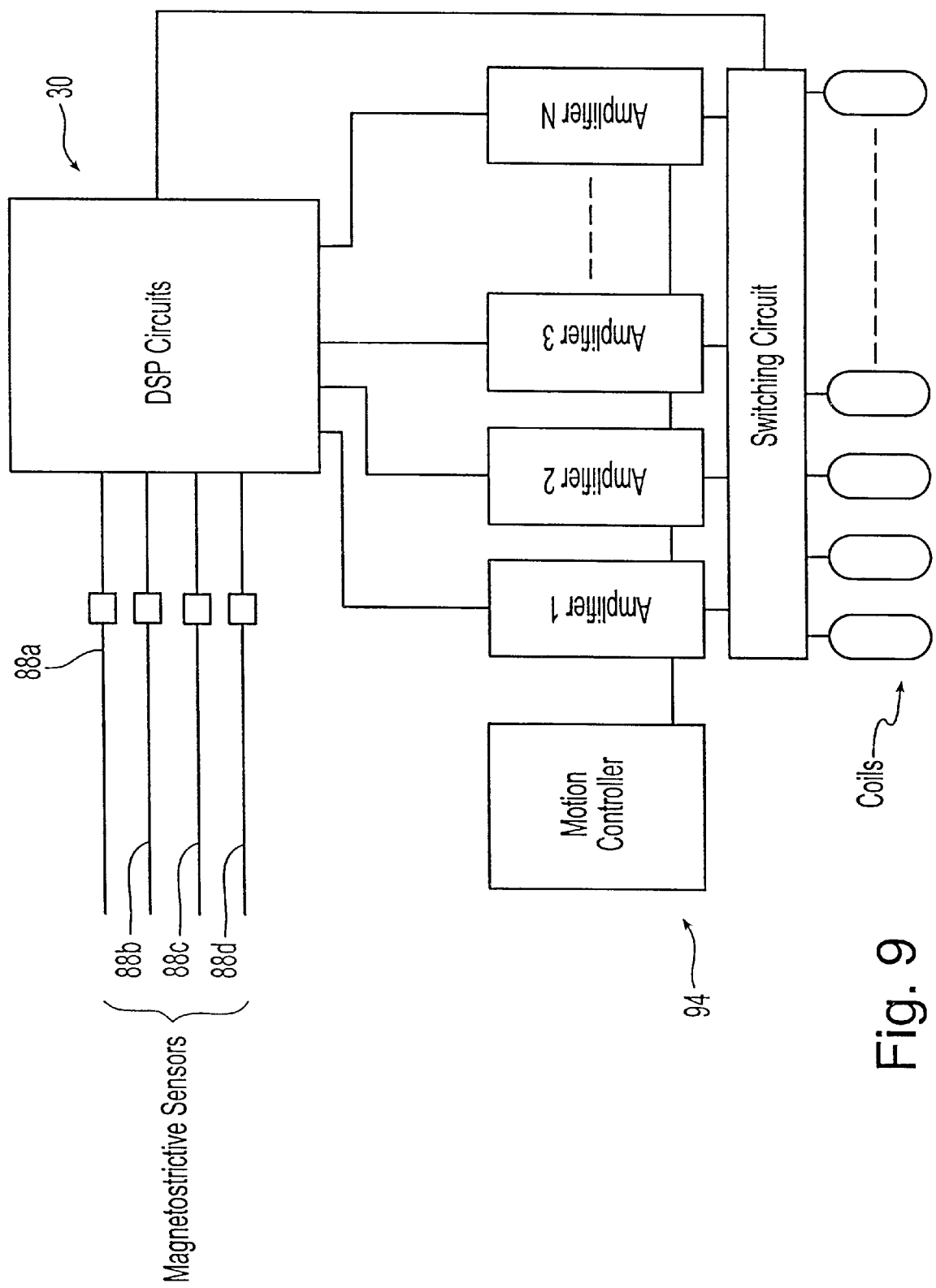
FIG. 9 is a schematic view of the control system configuration for use with the machine of FIGS. 7 and 7A–7C.

The control schematic of the system shown in FIG. 2 with non-absolute and magnetostrictive sensors is shown in FIG. 6. The control schematic of the system shown in FIGS. 7 and 7A–7C with all absolute or magnetostrictive sensors is shown in FIGS. 8 and 9. The components of FIGS. 8 and 9 are discussed in detail below. Similar components are found in the system of FIG. 6.

Referring to FIGS. 8 and 9, controller 30 includes a plurality of digital signal processors 90, 92 (DSPs) and a motion controller 94. Each DSP 90, 92 is electrically connected to at least one magnetostrictive sensor 88*a–d*, to the motion controller 94, and to the carriage drives. The first DSP 90 includes captures (CAP1–CAP3), time/compare component (CMP1), a timer (not shown), and a serial peripheral interface (SPI). The second DSP 92 has a capture (CAP2), time/compare component (CMP1), a timer (not shown), a SPI, and a serial communication interface (SCI). The SPI of DSP 90 and the SPI of DSP 92 are electronically joined to form a SPI time division multiplex (TDM) bus 96 for communication between the DSPs 90 and 92. The SCI of the second DSP 92 is in electronic communication with the motion controller 94 so that the DSP 92 is considered the master DSP. The bus 96 includes a plurality of timer slots and a service channel.

A recommended DSP from Texas Instruments is available under the part number TMS320F243. The DSPs embody sophisticated sensor processing such as digital filtering and correlation facilities that might be needed to make a robust feedback system. DSPs are very fast microprocessors whose internal program is easily changed. The DSP chosen has internal flash memory that can store non-volatile program instructions and data. Each DSP also has multiple levels and various types of interrupt structures so that an event driven, real-time operating system can be implemented and general purpose input and output pins can be easily configured for custom manipulation as known by those of ordinary skill in the art.

Referring to FIG. 8, after a power-up, during a stop condition when the carriages are stationary, or following a motion system fault, the controller 30 polls the magnetostrictive sensors 88a–d. This is done in a conventional manner whereby the controller 30 sends a poll request signal to each of the sensors 88a–d in order or at the same time. Once the sensor receives the poll request signal, the head 85 of the sensor 88a–d generates a current pulse that is passed along the tail or waveguide 86. The current pulse generates a moving magnetic field. The carriage C is disposed at a point along the tail 86 and the magnet thereon also generates a magnetic field. When the two magnetic fields interact, a strain pulse is generated that travels at sonic speed toward the free end of the tail 86, where the pulse is dampened, and back toward the head 85 until the head 85 detects the strain pulse.

When the current pulse is issued from the sensor 88a head, the sensor 88a also sends a start signal to the DSP 90 CMP1 that commands the DSP 90 to reset its timer. When the start signal is sent, the sensor 88a also immediately issues a stop signal to the DSP 90 CAP1 that is captured by the timer; however, the timer continues timing. Whenever one or more magnets are encountered, the sensor issues another stop signal. The DSP 90 discards the first stop signal and records the time of all other stop signals. The position of the magnet, and consequently the carriage C and tool thereon, is determined precisely by the DSP 90 measuring the elapse time between the launching of the current pulse, as indicated by the start signal, and the arrival of the strain pulse, as indicated by the second or subsequent stop signal.

Single DSP 90 has sufficient bandwidth to process start signals for multiple sensors 88a–c. With multiple sensors, the same start pulse is issued to multiple units and sent to the CMP1, and the stop signals are fed to separate capture areas CAP1–CAP3 of the DSP 90. This minimizes the need to communicate magnet positions between multiple DSPs for tracking purposes.

If the polling occurs at power-up, after the position of each carriage is known, the DSPs send output signals to the drivers which are used to close the servo-drive loop. The starting position of each carriage is calculated by knowing that the individual tool of each carriage will initially make contact with the web at predetermined intervals of time that depend on the number of pairs of carriages used and the cycle time of the machine (i.e., the time it takes a carriage to complete one revolution on the track).

The DSPs are setup to be interrupted a plurality of times. It is recommended that the interruptions occur 10 times per start signal period. When the DSP is interrupted, it determines the direction of movement and position of the magnets. The results are converted into step and direction signals or incremental signals fed to the drivers, which include as shown in FIG. 6, servo-amplifiers, switching circuits, and coils. Alternatively, other types of position or encoder signals can be used.

The control system of the present invention preferably is of a "closed loop" configuration. In a closed loop system, each of the movable elements (e.g. carriages) of the system is controlled as to the desired control variable along the path by appropriate electrical energy being supplied to the associated driver. The nature of the electrical energy applied to the driver determines what reaction the carriage of the system will exhibit. In a closed loop system, a feedback arrangement is provided which signals the position and direction at a given time.

The step and direction signals are signals representative of two control variables relating to the carriage. The DSP can generate signals related to other control variables, such as velocity, acceleration, or a combination thereof with or without direction. The DSP can generate ten step signals per start signal period. The direction signal indicates which way a given magnet is moving, clockwise or counter-clockwise. If the direction signal is changed on a particular interrupt, the step signal is inhibited from changing. From the step and direction signals the remaining kinematics of the carriage are determined, i.e. velocity, acceleration, etc., such as by a differentiator circuit. Most preferably these signals are processed at least partially by the feedback loop in the servomotors.

In the embodiment of FIG. 9, an array of coils is arranged on the outer surface of the assemblies 26a, b (as shown in FIG. 1) which are connected to servo-amplifiers through coil switching circuitry. There is one servo-amplifier for each carriage. Each coil could be powered by any one of the amplifiers which allows for independent control of each carriage. The controller 30 causes electrical energy to be fed to the drivers and causes the carriages to modify their speed when desired. The carriages have a permanent, drive magnet as in a typical DC brush-less servo-motor (not shown) thereon for operatively association with the coils. The interaction between the coils and the drive magnet produces a force which moves the carriage.

The opposing pairs of carriages on each subassembly 26a,b are independently controlled by the controller 30, which positions the opposing carriages to align the opposing sealing jaws with a predetermined portion of the tube 36. Preferably each predetermined portion is located at the marks 32, but alternatively the controller can be configured to engage the sealing jaws against another portion of the web spaced in relation to the marks 32 or other detectable part of the web or part whose position can be calculated. To attain this registration of the sealing jaws with the marks 32 or in a predetermined position relative thereto, the spacing between adjacent or proximate carriages can be varied while the carriages are still being driven and while the web is being drawn and sealed.

It may be desirable that the moving element is retained at a given position for a time which is greater than the time at which the same or other moving elements are retained at other positions. The carriages are movable in an infinite combination of starts, stops, changes in direction of movement, selected velocity, acceleration or combinations thereof.

Referring to FIG. 7, tracking of the magnets and carriages must account for the fact that in the preferred embodiment multiple sensors 88a–d are used and the magnet travels off of one sensor and onto another. Magnets will be sensed by a DSP that is not directly connected to that carriage's driver associated with that magnet. In order to track magnets, each DSP 90, 92 (in FIG. 5) must acquire the readings from all the other DSPs. The controller 30 must link the positional information from each sensor to create a single, continuous virtual sensor with positional data for the entire path.

Referring to FIG. 8, the step and direction are incremental position signals. The motor controller 94 needs to know the magnet locations in absolute units. The DSPs are connected in series in a known order. The master DSP 92 initiates the SPI communication between DSPs 90 and 92 to determine the order of the DSPs and to share position data among DSPs via the bus 96. Since all the DSPs share information on the SPI bus 96, any DSP can report the absolute position of any magnet to the motor controller 94. The motor controller 94 with the DSP order and the length of each sensor determines the carriage locations in absolute units.

The overlapping of sensors can be handled in three ways. First, the motor controller 94 can adjust the data it receives from the DSPs by the amount of the known overlap. Second, the motor controller 94 could notify the DSPs of the amount of the overlap by which to adjust their data. Third, the DSP could determine the offset by observing the position of the magnet when it is coincidently on two adjacent sensors.

The sensors preferably should be calibrated prior to their first use. Calibration data includes the magnetostrictive wave front velocity. This velocity value is communicated to the DSP 92 over the SCI port, and to DSP 90 over the service channel of the SPI TDM bus 96. The velocity for each sensor 88a–d is thus set to be the same value.

Figure 10:
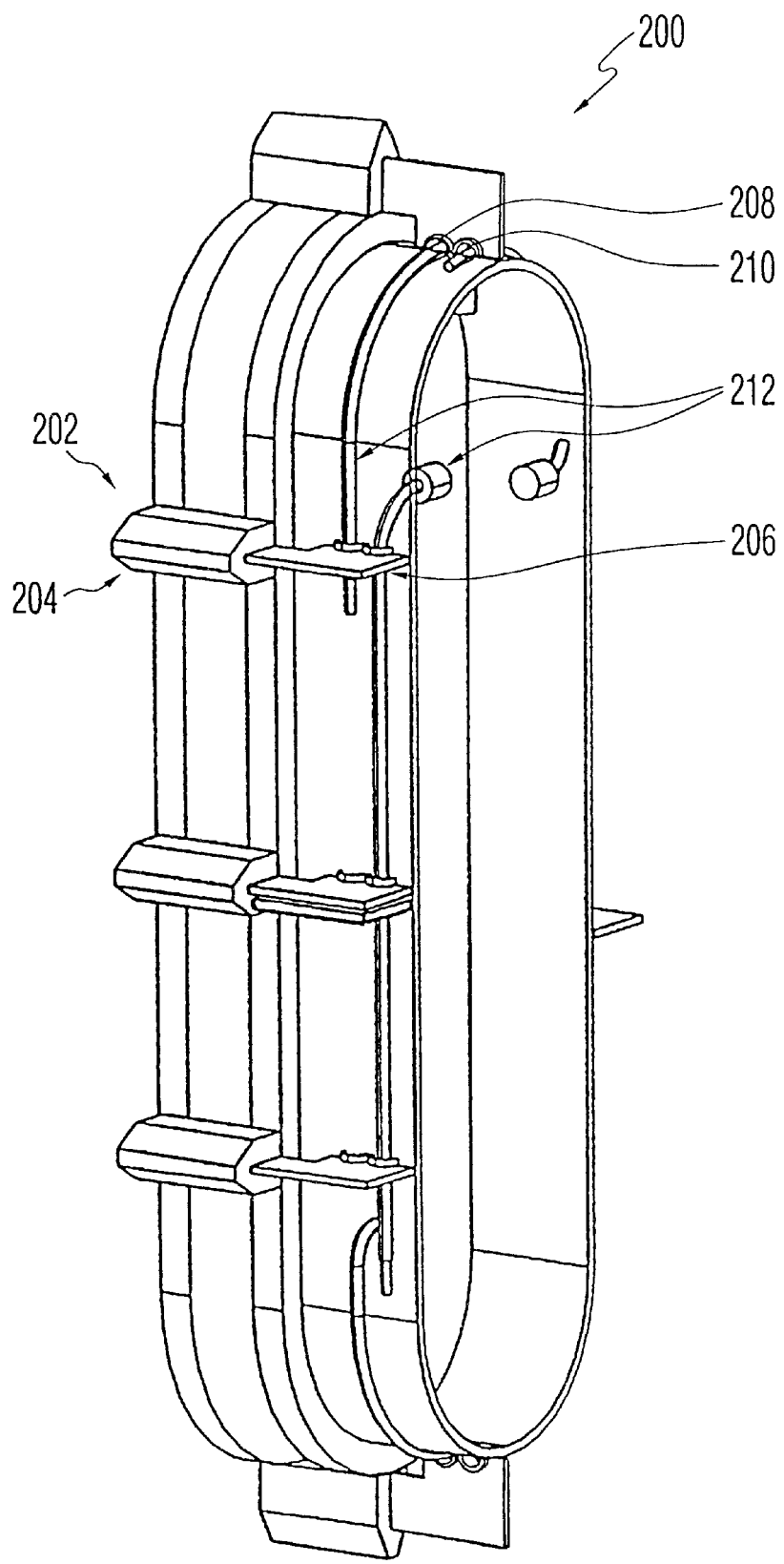
FIG. 10 is an enlarged, perspective view of an alternative embodiment of a carriage for use with the machine of FIG. 7.

With reference to FIG. 10, a support member 200 is shown. Support member 200 is for use with the sealing machine of FIG. 1. A plurality of modified carriages 202 are mounted for movement on the support members 200. Each carriage 202 includes a main portion 204 for supporting a tool and an outrigger portion 206 adjacent thereto for supporting two semicircular, adjacent magnets 208. The magnets 208 are disposed on a distal end 210 of the carriage and are shaped to receive the magnetostrictive sensors 212 and function therewith as disclosed above.

Figure 11:
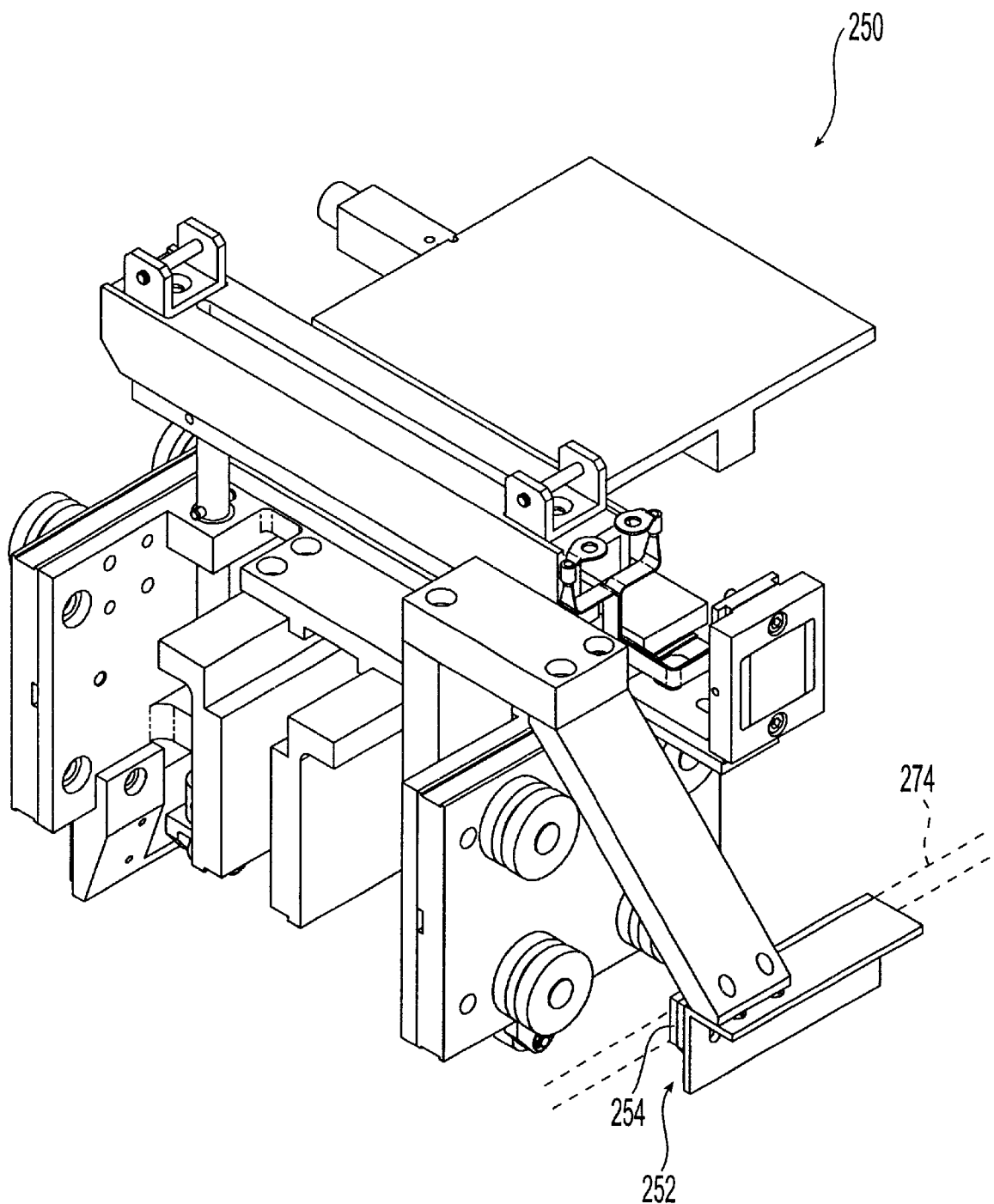
FIG. 11 is an enlarged, perspective view of an alternative embodiment of a carriage for use with the machine of FIG. 1.

Referring to FIG. 11, an alternative embodiment of the carriage 250 is shown. The carriage 250 is for use with the machine 10 of FIG. 1 as disclosed above. The carriage 250 includes an arm 252 for supporting the magnet 254, which is planar, for interaction with the magnetostrictive sensors 274.

Figure 12:
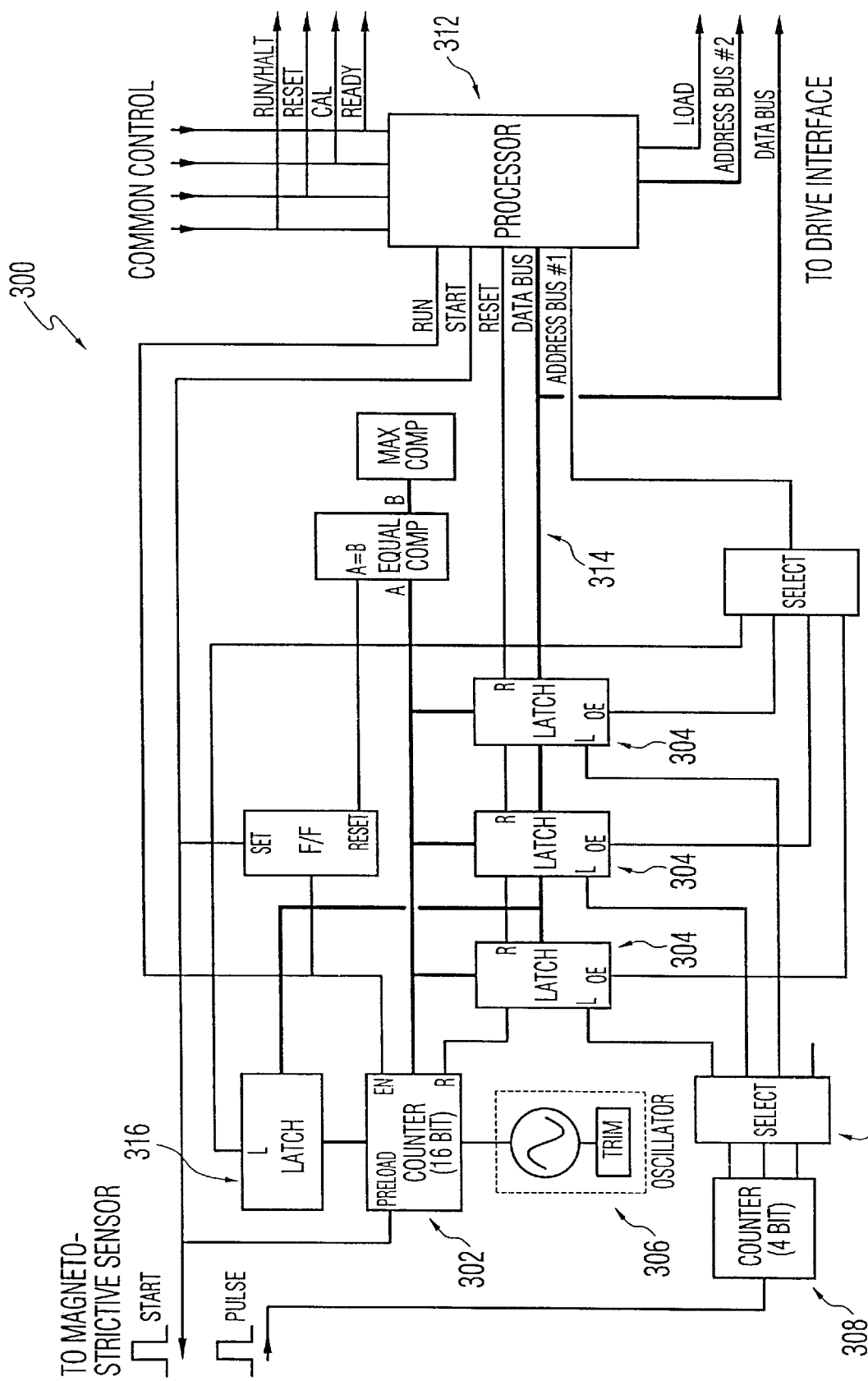
FIG. 12 is a schematic representation of an alternative embodiment of a sensor interface using discrete logic components.

In an alternative embodiment, the DSPs (shown in FIG. 8) can be replaced with separate logic devices. An example of a sensor interface using logic devices is shown in FIG. 12. This sensor interface 300 uses a first counter 302, a plurality of latches 304 arranged in parallel, an oscillator 306 located in the sensor head 85 (shown in FIG. 7), a second smaller counter 308, a selector 310, a processor 312, and a data bus 314. All of these components 302–314 are electrically connected. The latches 304 are connected to a data bus 314 in a tri-state (high impedance condition). The counter 302 can be preloaded with a positional offset by the processor 312, if desired. The preload can be done by data gathered during calibration or start-up or by means of a known quantity. The offset number is latched into a preload latch 316 by the processor 312 so that when a start pulse is generated setting the Run flip-flop, the offset is automatically loaded into the counter 302. The oscillator 306 is calibrated for the variation in waveguide speed and runs the counter 302 when it is released by the Run flip-flop. The output of the counter 302 is presented in parallel to the latches 304. The number of latches 304 is equal to the maximum number of carriages that may be on each subassembly. As each return pulse from the sensor is received, the counter 308 indexes through selector 310 to latch the data in sequential devices at each exact point in time. When the counter 302 reaches a predetermined maximum number, it is stopped by resetting the Run flip-flop. The processor 312 is alerted that data is available at this time and processing begins. The counters are structured as either up or down counters depending on the head to tail orientation of the magnetostrictive sensors. The preloaded offsets for each sensor allow true positional data to be deposited into each of the latches. The processor 312 can consider near equal positional data in the overlap zones 89 (as shown in FIG. 7) and select one for distribution. The processor 312 can also process this overlap data for use in updating the preload offsets on a dynamic basis, if drift over time or due to the temperature occurs, for example.

Figure 13:
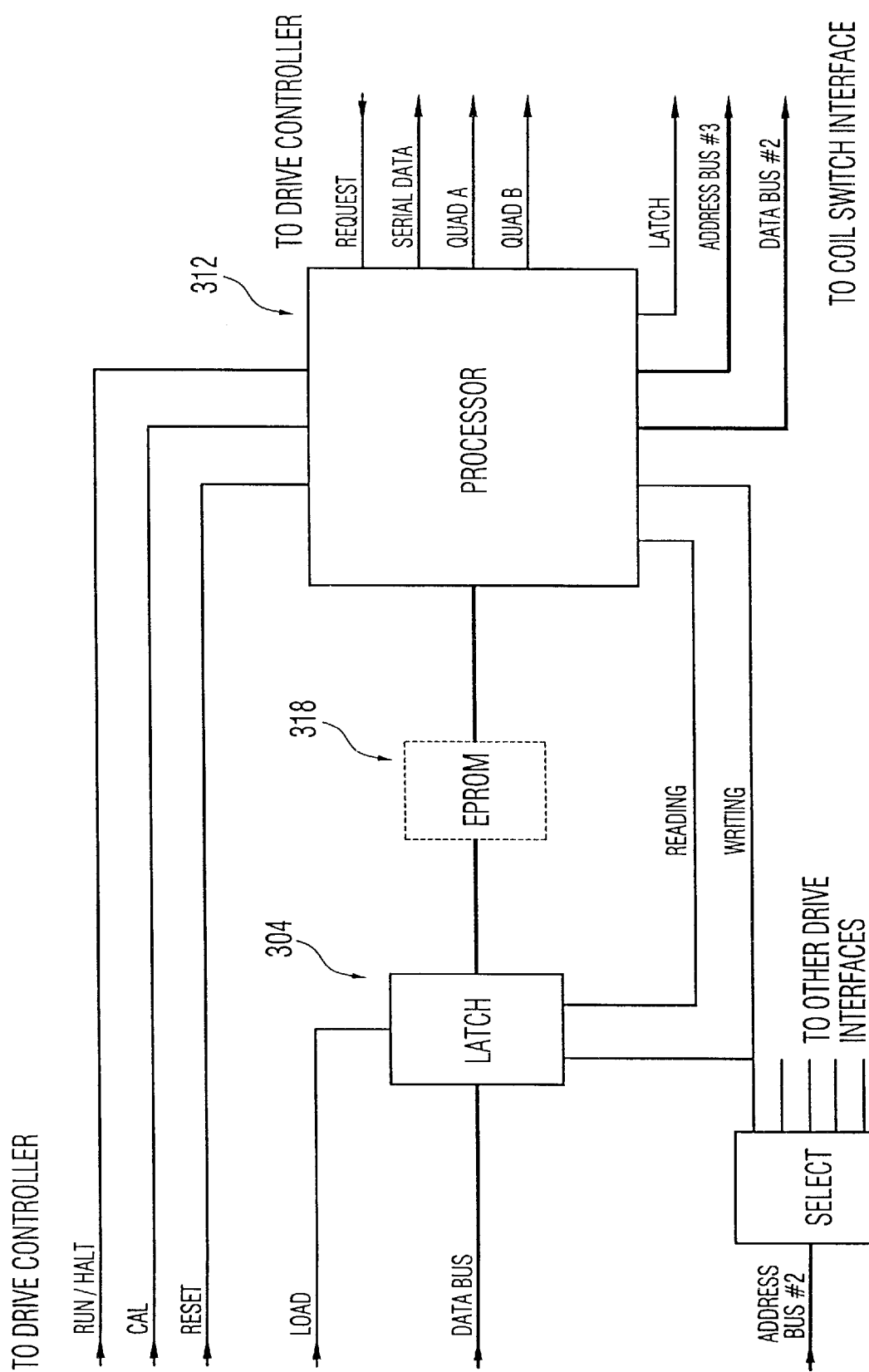
FIG. 13 is a schematic representation of a drive interface for use with the sensor interface of FIG. 12.

The processor 312 polls each latch by using an output enable selector. The data bus is also connected to the drive interface circuits, so that when valid positional data is found, it can be latched directly to the drive interface circuits according to the carriage number without additional processing. The drive interface is shown in FIG. 13. The number of drive interface circuits equals the number of carriages under control. The data latched from the counter is in pure binary format. It represents the exact positional data for each carriage. This data can be converted to any format needed by the master controller or individual drive. An EPROM 318 which converts binary data to Gray code can be inserted in the data path, for example. The EPROM 318 is another processor in the drive interface circuit that presents data in the appropriate format to the processor 312 and to the drive logic components when requested. A microcontroller may best provide the required functionality here, but this circuit might also be designed as discrete logic gates. Processors for each carriage can also be electrically connected to one another to provide a single data stream for the processor 312. Reading and writing signals prevent data transition during access. For the drives arrangement, parallel to serial conversion, difference encoding and quadrature signaling can be provided, as needed. The processor 312 also controls the coil switching for the drive based on the carriages' position.

Figure 14:
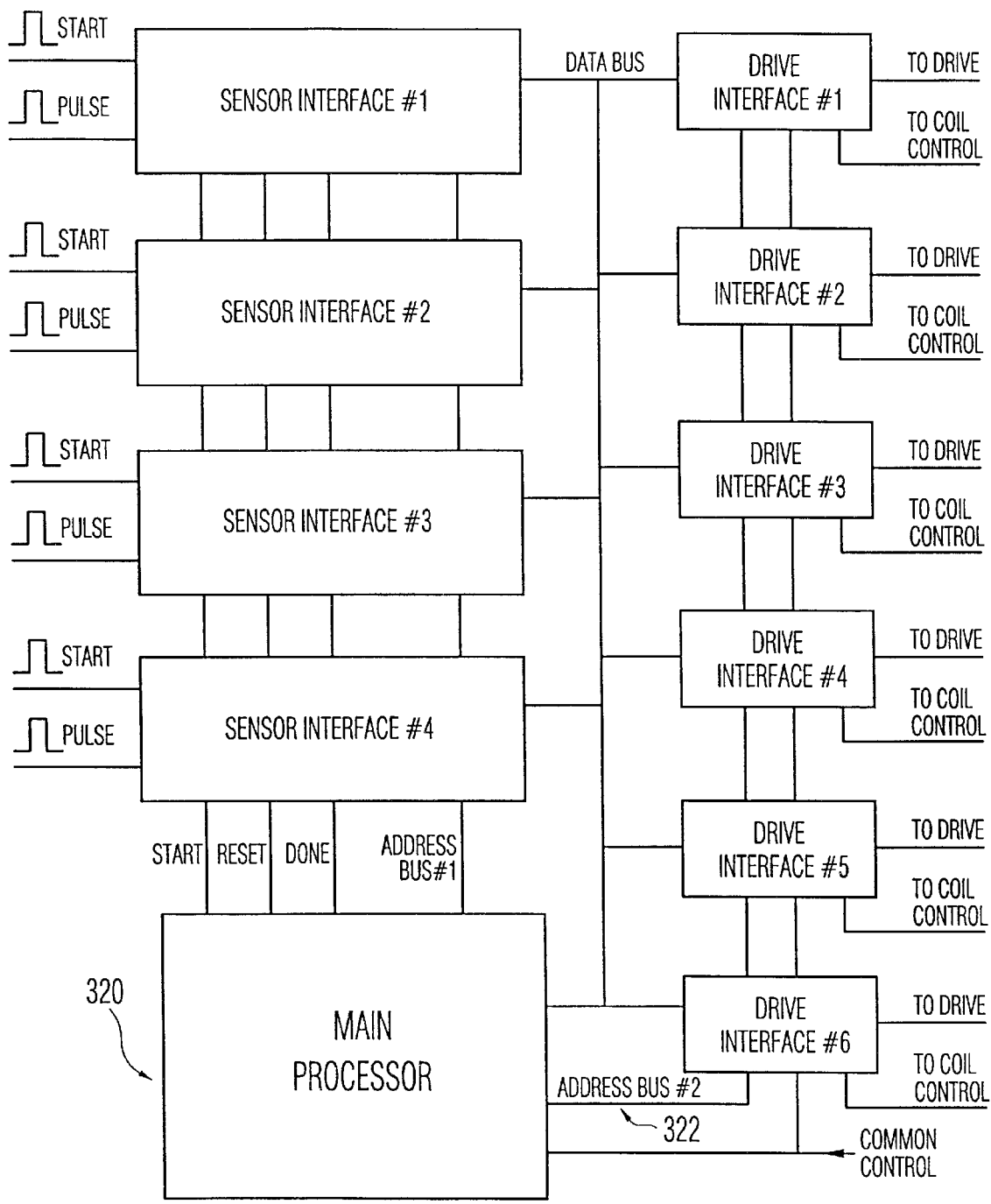
FIG. 14 is a schematic representation of a full system using a plurality of the sensor interfaces of FIG. 12 and a plurality of the drive interfaces of FIG. 13.

Referring to FIG. 14, a full system is shown. In this embodiment, there are fou magnetostrictive sensors and six carriages. For each of the sensors there is a sensor interface (as shown in FIG. 12). For each carriage there is a drive interface (as shown in FIG. 13). Main processor 320 invokes reset and then starts the data collection cycle. When all the interface as signal "down," each interface and each latch therein is poled in turn. The processor 320 determines the validity of each datum and assigns it to a particular drive by means of calculations to determine the drive number. The drive address is then asserted on data bus 322 and load is evoked. This deposits the data on the drive interface. Processing inside each drive interface presents data to the drive controllers and coil control circuitry as required.

Calibration of the system of FIGS. 12–14 is required at each machine initialization. In a stopped mode, the carriages are positioned at each overlap zone. By comparing data from the two sensors in this zone, the main processor 320 can then calculate the needed offsets. As a check, the processor will load these offsets into the preload latches and look for identical data from adjacent sensors. This data is stored in nonvolatile memory so that it is not lost if the power fails.

The system uses a reset routine that involves re-identifying each carriage number and position. For reset, in a stopped mode data is collected. A first carriage is identified by the close data resulting from a double magnet. Positional data for each carriage is latched to the corresponding drive interface. When the controller requests data, each drive interface reports the exact position of its axis. The system can now be started.

Details of the system related to the assemblies, such as the sealing and cutting tools, the driver and switches, the controller, and the like are disclosed in various applications. The following such applications were filed Apr. 26, 2000 and the contents of each application is incorporated herein by reference thereto in their entirety: U.S. application Ser. Nos. 09/558,229 and 09/558,327 to Jacobs et al., entitled "Packaging Machine"; U.S. application Ser. No. 09/558,332 to Jacobs et al., entitled "Machine with Independently Movable Tools"; U.S. application Ser. No. 09/558,234 to Hoffman et al., entitled "Induction Sealing Jaw"; U.S. application Ser. No. 09/558,233 to Ortiz et al., entitled "Variable Motion System and Method"; and U.S. application Ser. No. 09/558,063 to Ortiz et al., entitled "Multi-Jaw Transverse Sealer".

While it is apparent that the invention herein disclosed is well calculated to fulfill the objects above stated, it will be appreciated that modifications and embodiments may be devised by those skilled in the art. For example, the movable members of the present system may be mounted for movement on the track by sliding interconnections between the movable member and the track, or the movable member could be levitated magnetically with respect to the track. In another embodiment, the features of this invention can be applied to a variety of applications such as automobiles or other vehicles, people movers, marine applications, and drilling or other machining applications or the like. The embodiments above can also be modified so that some features of one embodiment are used with the features of another embodiment. Furthermore, the magnets can be connected to the carriages in any number of configurations so long as they operate with the sensors as necessary. It is intended that the appended claims cover all such modifications and embodiments as fall within the true spirit and scope of the present invention.

What is claimed is:

1. A machine comprising:
   at least two closed paths defined by at least two separate guide members spaced from one another;
   at least two magnetostrictive sensors disposed on each path;
   at least one movable element mounted for movement on each path;
   at least one programmable controller operatively associated with each sensor and each movable element, wherein the controller receives at least one signal from one of the sensors which is representative of at least one control variable of at least one of the associated movable elements.

2. The machine of claim 1, wherein a plurality of movable elements are mounted to be movable and positionable independently of one another on each path.

3. The machine of claim 1, wherein the magnetostrictive sensors at least partially overlap.

4. The machine of claim 1, further including three or more magnetostrictive sensors.

5. The machine of claim 1, wherein the magnetostrictive sensors have different lengths.

6. The machine of claim 1, wherein at least one movable element includes a magnet operatively associated with the sensors.

7. The machine of claim 1, wherein each magnetostrictive sensor has a head and a waveguide electrically connected thereto, the head being electrically connected to the controller.

8. The machine of claim 7, wherein the heads of the magnetostrictive sensors are spaced apart from one another.

9. A machine comprising:
   at least two closed paths defined by at least two separate guide members spaced from one another;
   at least one magnetostrictive sensor disposed on each paths;
   at least one non-absolute sensor disposed on each paths;
   at least one movable element mounted for movement on each path;
   at least one programmable controller operatively associated with each sensor and each movable element, wherein the controller receives at least one signal from one of the sensors which is representative of at least one control variable of at least one of the associated movable elements.

10. The machine of claim 9, wherein the non-absolute sensor(s) is a step and direction type of sensor or an incremental type of sensor.

11. The machine of claim 10, wherein the non-absolute sensor(s) is at least one Hall Effect sensor.

12. The machine of claim 9, further including a plurality of non-absolute sensors.

13. The machine of claim 12, further including a plurality of magnetostrictive sensors.

14. The machine of claim 9, wherein the movable element includes a first magnet operatively associated with the magnetostrictive sensor(s) and an actuation device operatively associated with the non-absolute sensor(s).

15. The machine of claim 14, wherein the actuation device is a second magnet.

16. The machine of claim 9, wherein each magnetostrictive sensor has a head and a waveguide electrically connected thereto, the head being electrically connected to the controller.

17. A method for using at least two magnetostrictive sensors on each of at least two closed paths defined by at least two separate guide members spaced from one another, comprising the steps of:
   providing at least one moveable element for each path, that is movable on the path, and each movable element includes at least one magnet;
   providing at least two magnetostrictive sensors on each path for outputting positional information on each movable element, each magnetostrictive sensor is operatively associated with the at least one magnet;
   providing a first programmable controller electrically connected to the sensors; and
   using the positional information from each sensor so that the first programmable controller links the sensors into a single, continuous, virtual sensor on each path.

18. The method of claim 17, further comprising the step of providing a second programmable controller, wherein the second programmable controller uses the virtual sensor to control the movement of the movable elements.

19. The method of claim 18, wherein the first programmable controller is at least one digital signal processor and the second programmable controller is a motion controller.

20. The method of claim 18, further including using the positional information to perform commutation alignment, when the associated movable element is stationary.

21. The method of claim 17, wherein the step of using the positional information further includes determining a known position for each movable element on each path, when the associated movable element is stationary.

22. The method of claim 17, wherein the step of using the positional information further includes determining a known position for each movable element on each path, when the associated movable element is moving.

23. A method for using positional information on at least one movable element disposed on a closed path defined by a guide member, comprising the steps of:
   providing at least one movable element that is movable on the path, and each movable element includes at least one magnet;
   providing at least one magnetostrictive sensor on the path for outputting positional information on each movable element, each magnetostrictive sensor is operatively associated with the at least one magnet;
   providing a first programmable controller electrically connected to each sensor;
   using the positional information from each sensor; and
   wherein the step of providing at least one movable element further includes providing a servo-motor with each movable element, and the step of using the positional information includes performing commutation alignment on each servo-motor using the positional information from each sensor.

24. The method of claim 23, wherein the step of performing commutation alignment occurs when the associated movable element is stationary.

25. The method of claim 23, wherein the step of using the positional information further includes determining a known position for the movable element on the path, when the associated movable element is stationary.

26. The method of claim 23, further including providing at least one non-absolute sensor on the path and determining a known position for each movable element using information from each non-absolute sensor.

* * * * *